United States Patent
Cho et al.

(10) Patent No.: US 10,449,521 B2
(45) Date of Patent: Oct. 22, 2019

(54) METHOD FOR PREPARING NANOPARTICLES SUPPORTED ON HYDROPHOBIC CARRIER, AND NANOPARTICLES SUPPORTED ON CARRIER, PREPARED THEREBY

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR); Kwanghyun Kim, Daejeon (KR); Ran Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 15 days.

(21) Appl. No.: 15/501,783

(22) PCT Filed: Jul. 28, 2015

(86) PCT No.: PCT/KR2015/007893
§ 371 (c)(1),
(2) Date: Feb. 3, 2017

(87) PCT Pub. No.: WO2016/021863
PCT Pub. Date: Feb. 11, 2016

(65) Prior Publication Data
US 2017/0216824 A1 Aug. 3, 2017

(30) Foreign Application Priority Data
Aug. 6, 2014 (KR) .......... 10-2014-0100979

(51) Int. Cl.
B01J 21/18 (2006.01)
B01J 23/40 (2006.01)
(Continued)

(52) U.S. Cl.
CPC ............. B01J 23/892 (2013.01); B01J 21/18 (2013.01); B01J 23/8906 (2013.01);
(Continued)

(58) Field of Classification Search
CPC ...... B01J 21/18; B01J 23/8906; B01J 23/892; B01J 35/0013; B01J 35/023; B01J 37/0201; B01J 37/04
See application file for complete search history.

(56) References Cited

U.S. PATENT DOCUMENTS

2008/0276835 A1* 11/2008 Koyama ............... B82Y 30/00
106/286.4
2011/0207019 A1 8/2011 Mukerjee
(Continued)

FOREIGN PATENT DOCUMENTS

| CN | 102989450 A | 3/2013 | |
| DE | 102007023491 A1 * | 11/2008 | ........... A61K 9/5115 |

(Continued)

OTHER PUBLICATIONS

Qian et al., PtM/C Catalyst Prepared Using Reverse Micelle Method for Oxygen Reduction Reaction in PEM Fuel Cells, J. Phys. Chem. C., 2008, 112, 1146-1157.*

Primary Examiner — Jun Li
(74) Attorney, Agent, or Firm — Dentons US LLP

(57) ABSTRACT

The present specification relates to a method for preparing nanoparticles supported on a carrier, and nanoparticles supported on a carrier, prepared thereby.

13 Claims, 8 Drawing Sheets

(51) Int. Cl.
*B01J 23/74* (2006.01)
*B01J 23/89* (2006.01)
*B01J 35/00* (2006.01)
*B01J 35/02* (2006.01)
*B01J 37/02* (2006.01)
*B01J 37/04* (2006.01)
*H01M 4/92* (2006.01)

(52) U.S. Cl.
CPC ......... *B01J 35/0013* (2013.01); *B01J 35/023* (2013.01); *B01J 37/0201* (2013.01); *B01J 37/04* (2013.01); *H01M 4/921* (2013.01); *H01M 4/926* (2013.01)

(56) References Cited

U.S. PATENT DOCUMENTS

| | | | | |
|---|---|---|---|---|
| 2012/0135862 A1* | 5/2012 | Hwang | ........... | B82Y 30/00 502/339 |
| 2012/0168692 A1 | 7/2012 | Son, II et al. | | |
| 2013/0053239 A1* | 2/2013 | Carpenter | ........... | H01M 4/921 502/326 |
| 2013/0126798 A1* | 5/2013 | Nakatani | ........... | B01J 13/0043 252/514 |
| 2014/0171297 A1* | 6/2014 | Goia | ........... | B01J 23/892 502/185 |

FOREIGN PATENT DOCUMENTS

| | | |
|---|---|---|
| KR | 1020110110538 A | 10/2011 |
| KR | 1020120062394 A | 6/2012 |
| WO | 2011031118 A9 | 3/2011 |
| WO | 2012026686 A2 | 3/2012 |

\* cited by examiner

[Figure 1]
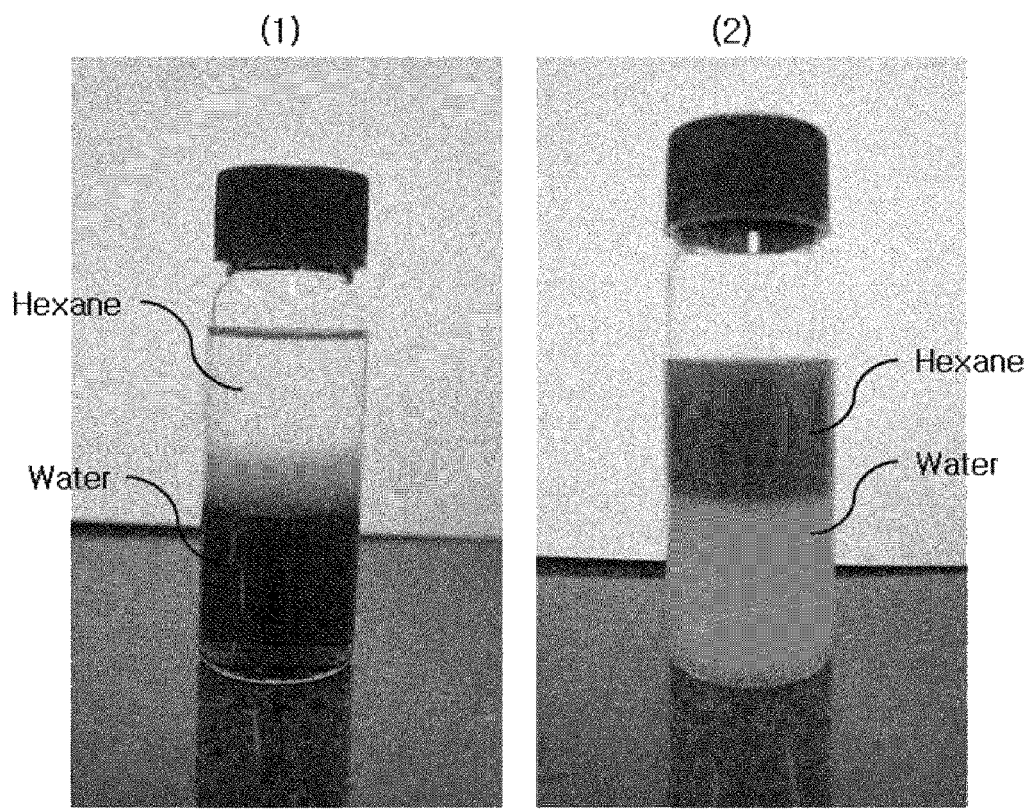

[Figure 2]
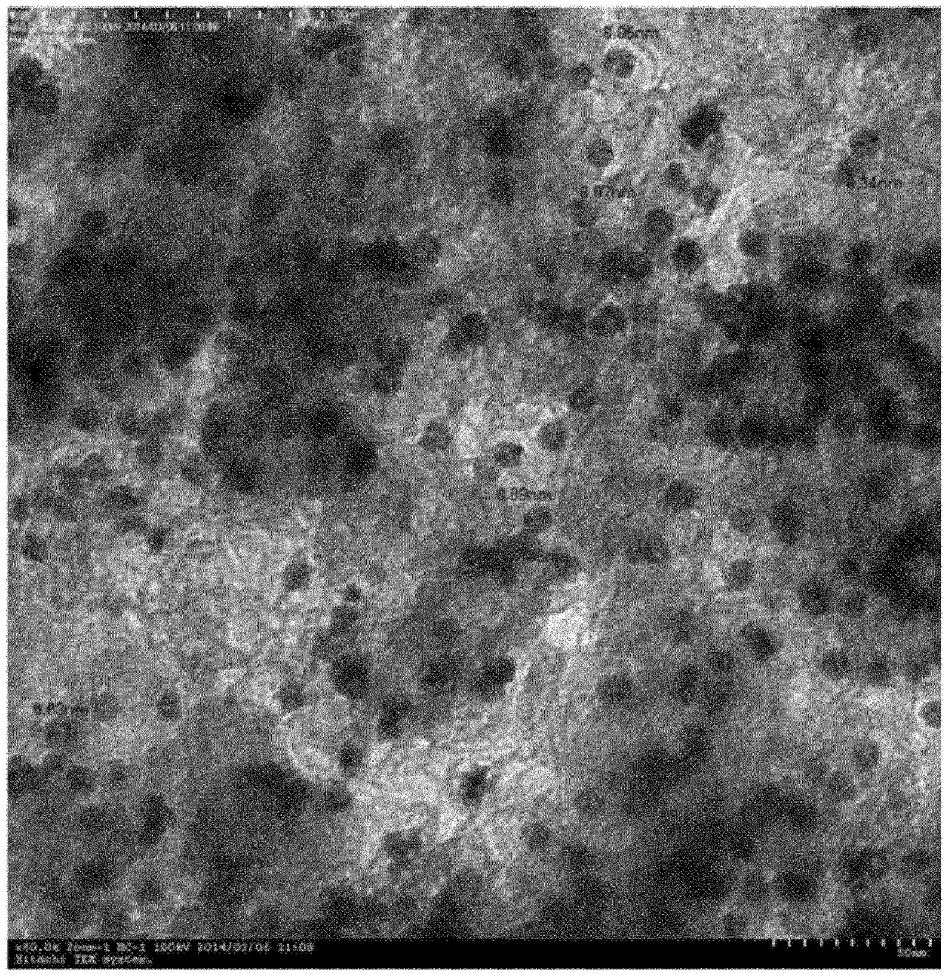

[Figure 3]
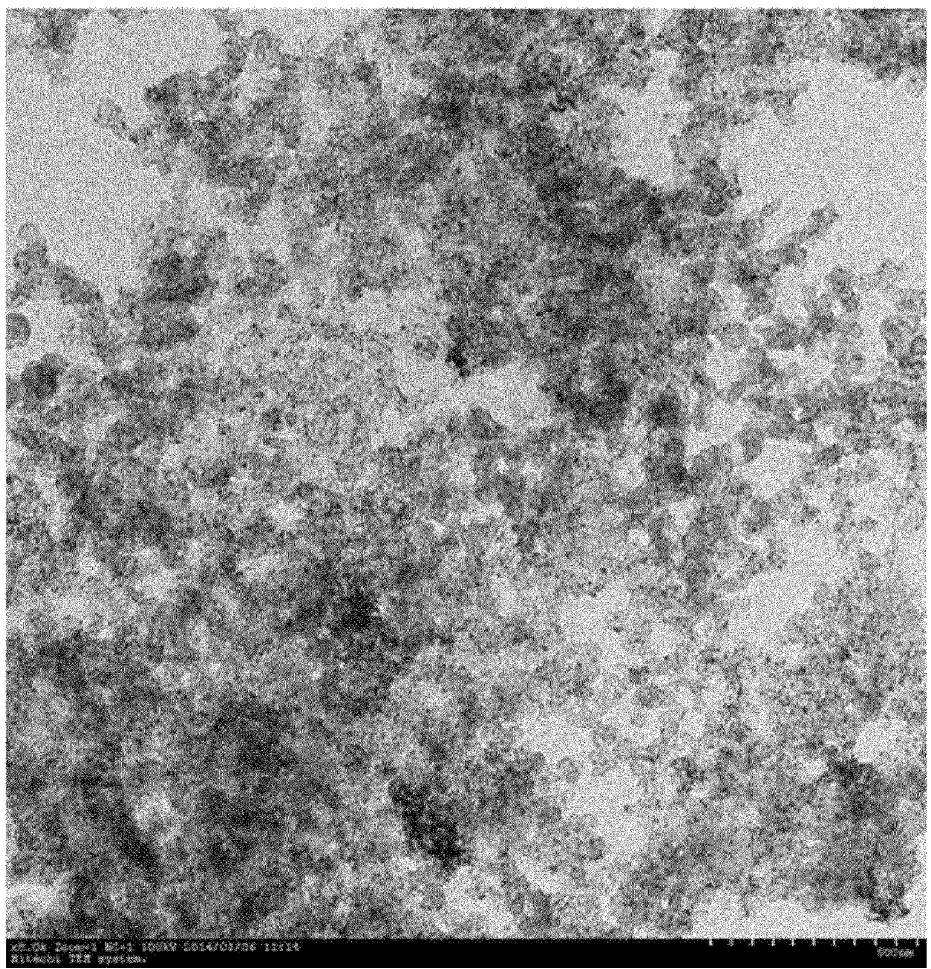

[Figure 4]
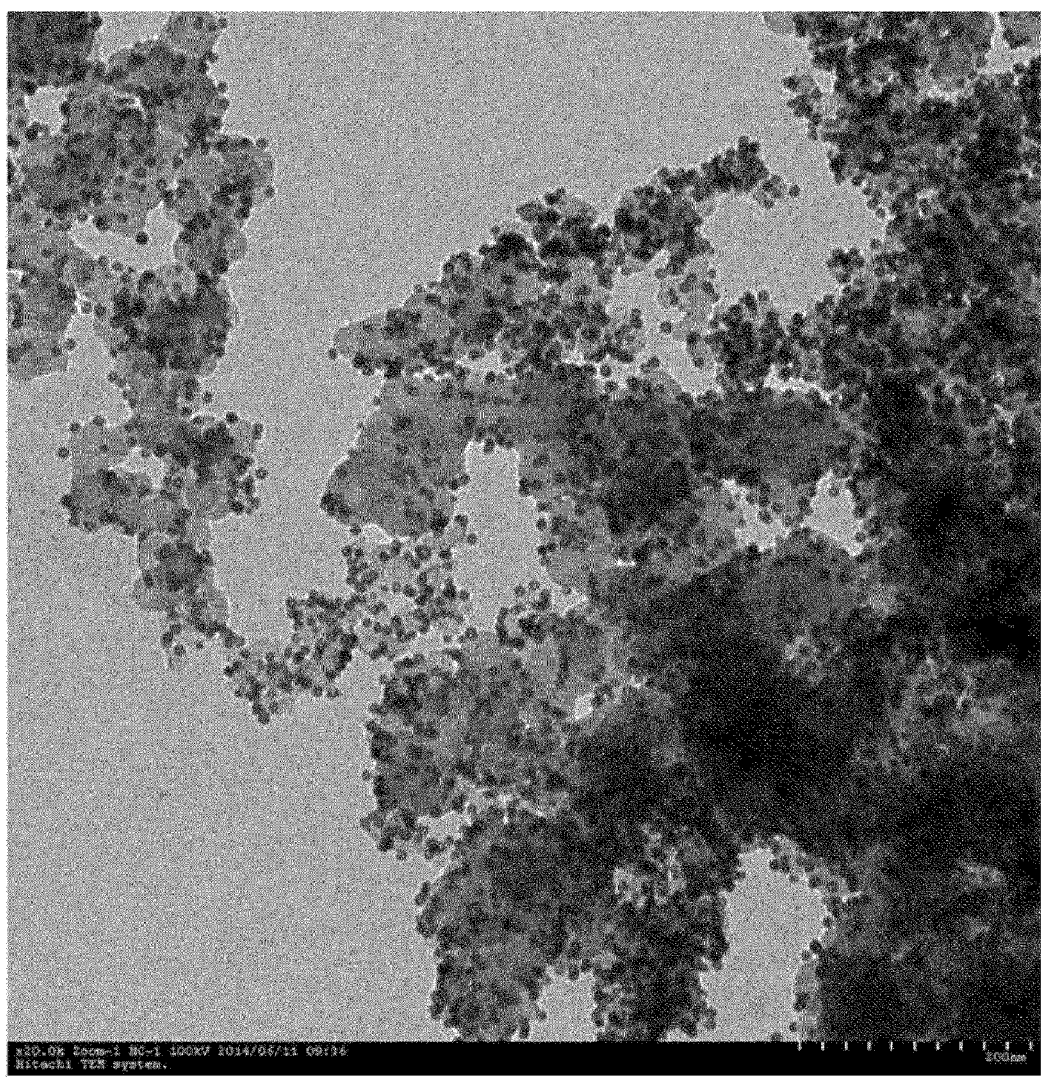

[Figure 5]
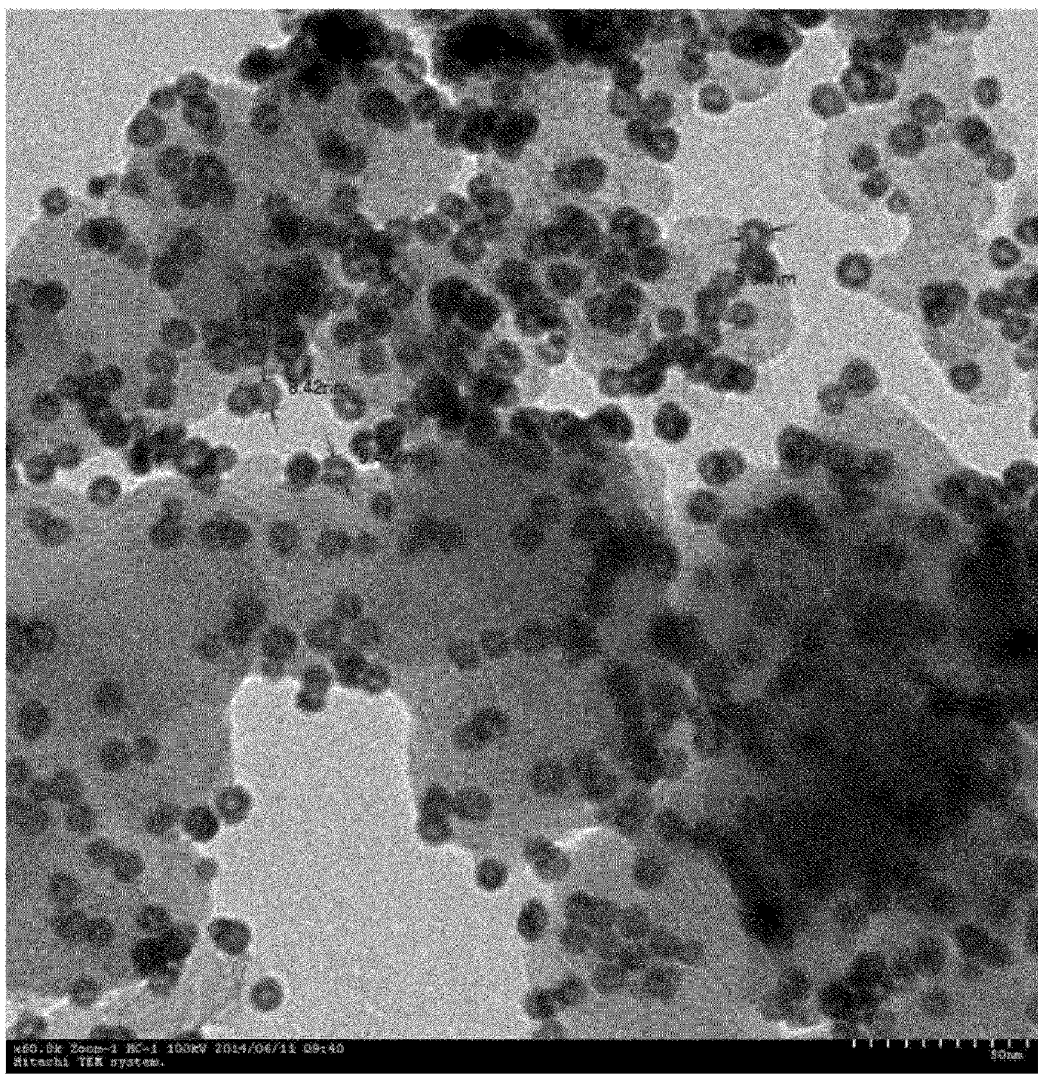

[Figure 6]
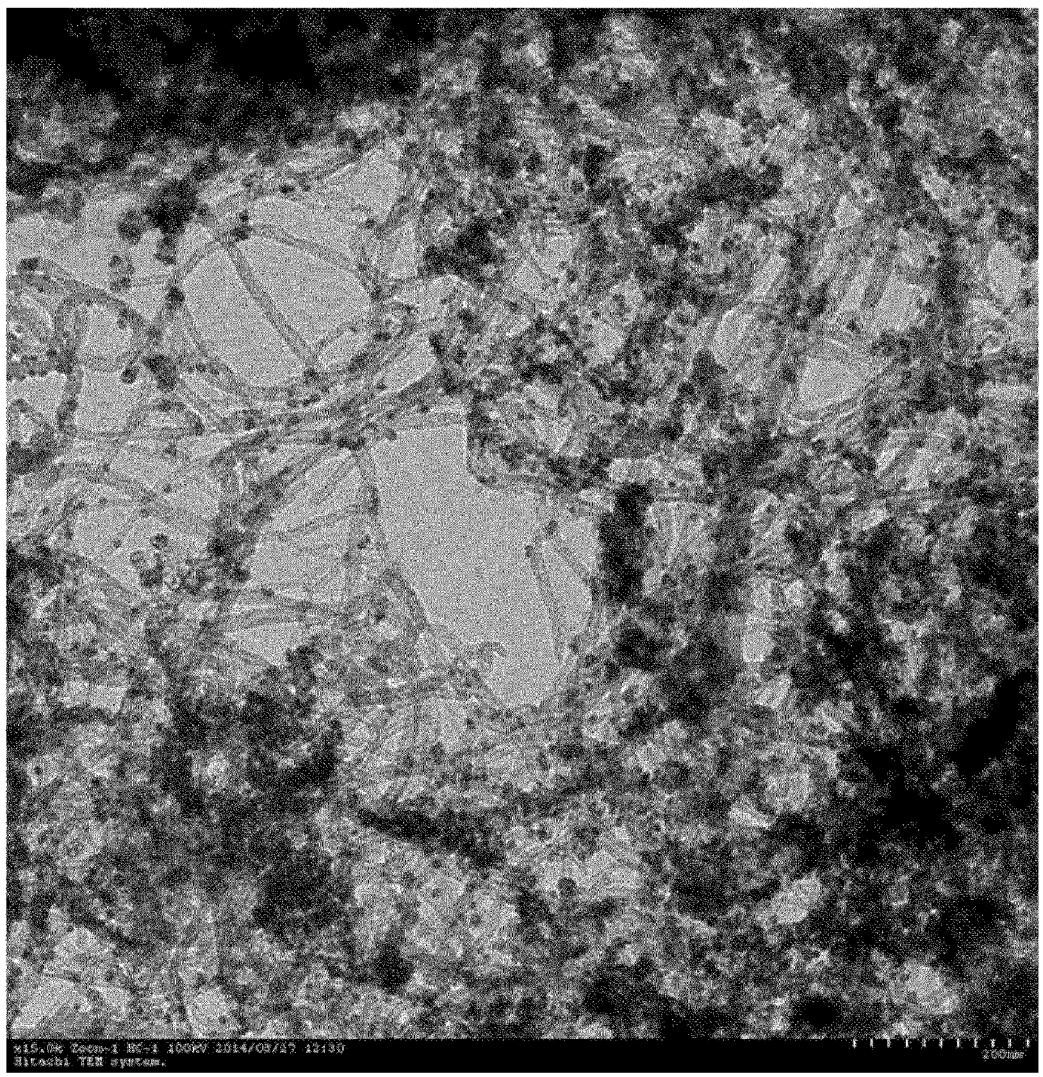

[Figure 7]
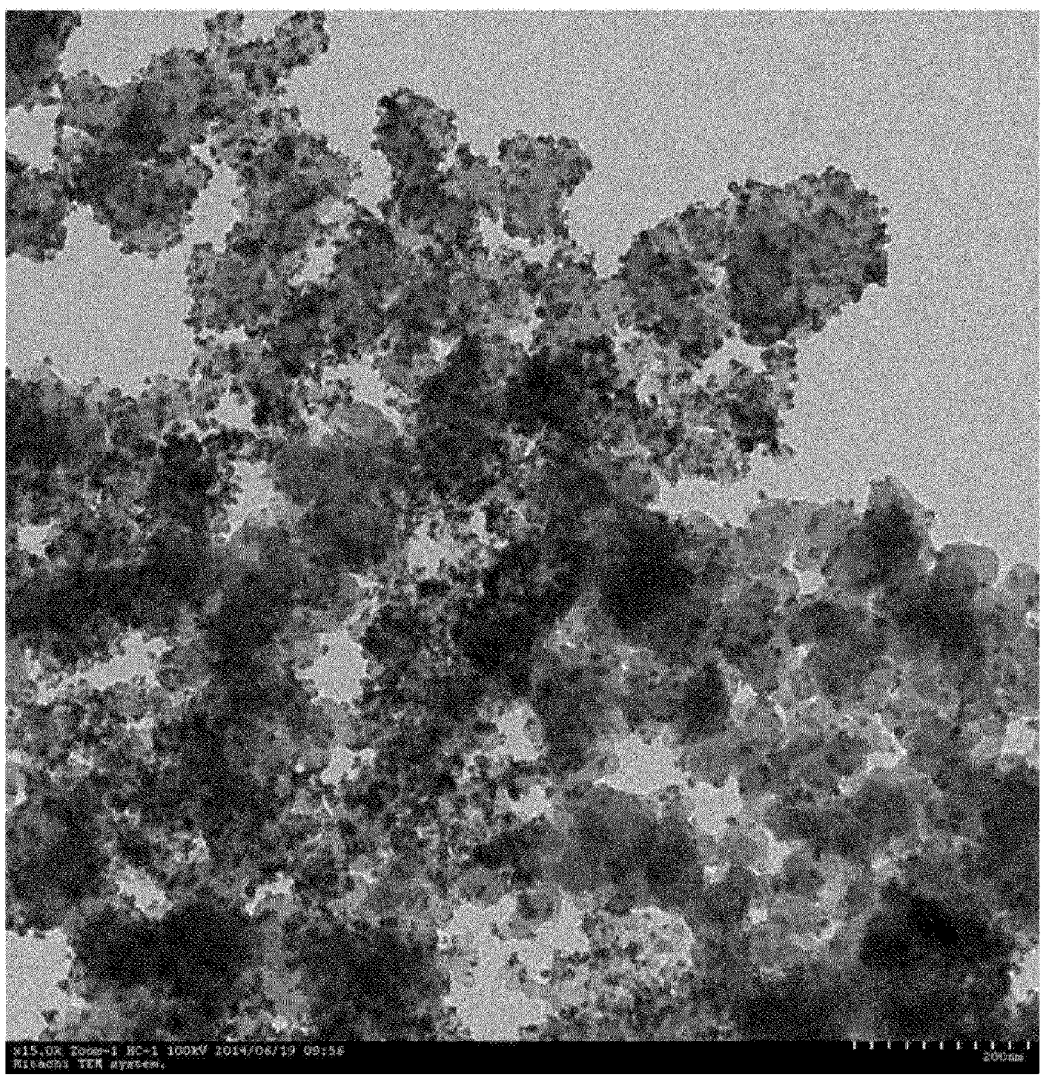

[Figure 8]
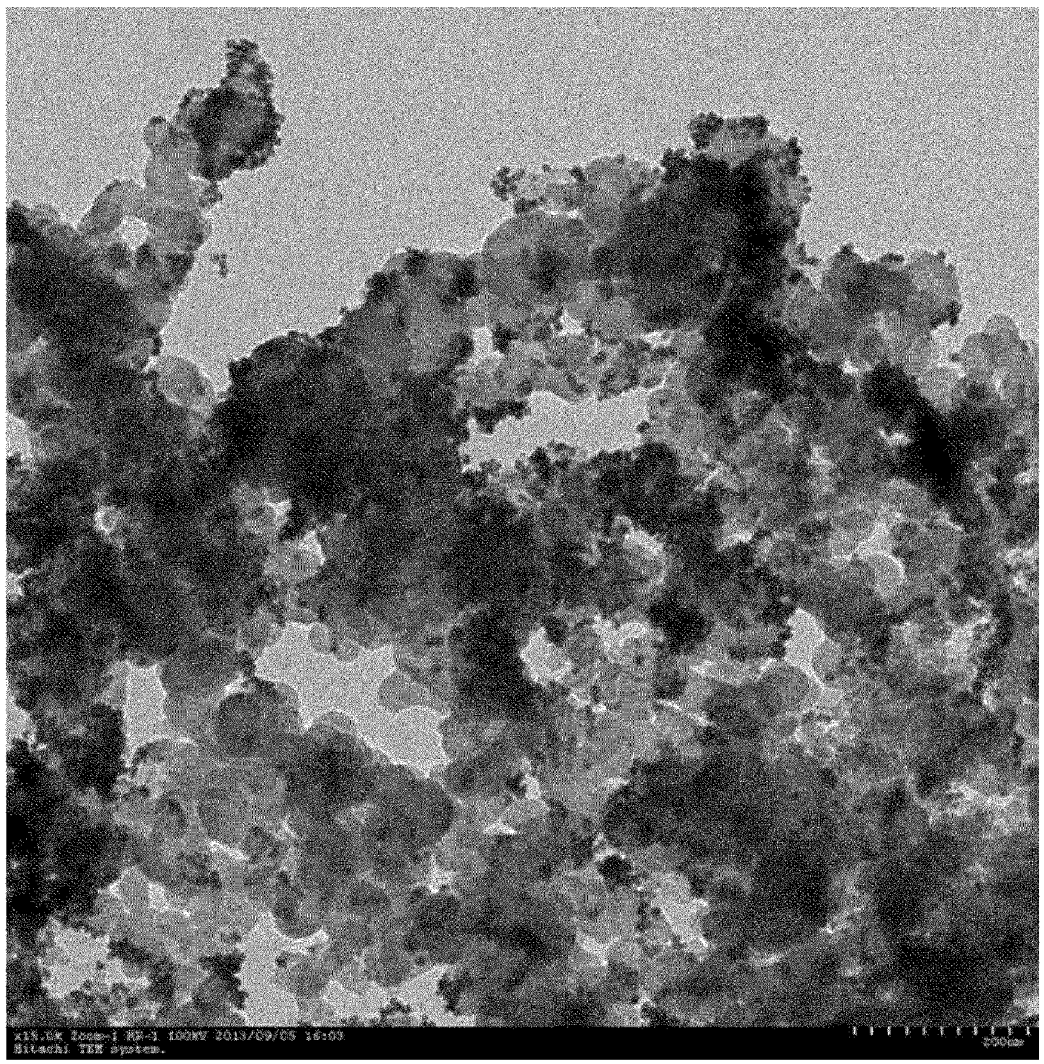

METHOD FOR PREPARING NANOPARTICLES SUPPORTED ON HYDROPHOBIC CARRIER, AND NANOPARTICLES SUPPORTED ON CARRIER, PREPARED THEREBY

TECHNICAL FIELD

This application is a National Stage Entry of International Application No. PCT/KR2015/007893, filed on Jul. 28, 2015, and claims the benefit of and priority to Korean Application No. 10-2014-0100979, filed on Aug. 6, 2014, all of which are hereby incorporated by reference in their entirety for all purposes as if fully set forth herein.

The present specification relates to a method for preparing nanoparticles supported on a hydrophobic carrier, and nanoparticles supported on a hydrophobic carrier, prepared thereby.

BACKGROUND ART

Carbon black is generally used as a support of a fuel cell catalyst. However, when carbon black is used as a support, there occurs a problem with the durability due to the corrosion of carbon.

In order to alleviate the problem, studies on carbon nanotube (CNT), carbon nanofiber (CNF), carbon nanocage (CNC), and the like, which are crystalline carbon forms having a high corrosion resistance, have been actively conducted. However, these crystalline carbon forms have a problem in that these carbon forms are not dispersed well in a polar solvent due to the strong surface water repellency thereof. For this reason, there is a problem in that platinum is agglomerated without being uniformly dispersed in the process of loading platinum into a carbon support.

In order to solve the problem, an acid treatment method in which the surface of carbon is oxidized to attach a function group to the surface has been widely used (Chem. Eur. J., 8, 1151). In the acid treatment method, a strong acid such as nitric acid, sulfuric acid, or a mixed solution of nitric acid and sulfuric acid is used, and a functional group including oxygen such as a carboxyl group (—COOH), a hydroxyl group (—OH), and a carbonyl group (>C=O) is formed on the surface of carbon. Due to the functional group thus formed on the surface of carbon, the hydrophilicity is increased to provide a deadlock point of platinum ions and the solubility in a polar solvent is increased to enhance the dispersibility of platinum.

However, there is a problem in that the surface treatment of crystalline carbon using an acid treatment damages the surface of crystalline carbon, and thus reduces corrosion resistance of crystalline carbon, and the durability deteriorates. Therefore, an acid treatment method using a strong acid is advantageous in supporting a catalyst, but has a limitation of reducing the durability of a catalyst of a fuel cell by increasing the corrosion of carbon.

CITATION LIST

Official Gazette of Korean Patent Application Laid-Open No. 10-2013-0090807

DETAILED DESCRIPTION OF THE INVENTION

Technical Problem

The present specification provides a method for preparing nanoparticles supported on a hydrophobic carrier, and nanoparticles supported on a hydrophobic carrier, prepared thereby.

Technical Solution

An exemplary embodiment of the present specification provides a method for preparing nanoparticles supported on a hydrophobic carrier, the method including: a nanoparticle preparing step of preparing nanoparticles; a nanoparticle surface modifying step of stirring a non-polar solution including an aqueous solution including the nanoparticles, a non-polar solvent, an organic dispersing agent, and acid to make the nanoparticles move to the non-polar solution; and a supporting step of supporting the nanoparticles onto the hydrophobic carrier by mixing the non-polar solution including the nanoparticles with the hydrophobic carrier.

An exemplary embodiment of the present specification provides nanoparticles supported on a hydrophobic carrier, prepared by the preparation method.

An exemplary embodiment of the present specification provides nanoparticles supported on a hydrophobic carrier, including: a hydrophobic carrier; and one or more nanoparticles supported on the hydrophobic carrier, in which the hydrophobic carrier is a carbon-based carrier, which is not subjected to pre-treatment.

An exemplary embodiment of the present specification provides a catalyst including the nanoparticles supported on the hydrophobic carrier.

Advantageous Effects

The nanoparticles supported on a hydrophobic carrier according to an exemplary embodiment of the present specification have an advantage in that the nanoparticles have excellent corrosion resistance because a hydrophobic carrier, which is not chemically treated, is used.

Further, in the nanoparticles supported on a hydrophobic carrier according to an exemplary embodiment of the present specification, the electrical conductivity of the carrier is not impaired because a hydrophobic carrier, which is not chemically treated, is used.

In addition, in the nanoparticles supported on a hydrophobic carrier according to an exemplary embodiment of the present specification, the specific surface area of the carrier is not lost because a hydrophobic carrier, which is not chemically treated, is used.

The method for preparing nanoparticles supported on a hydrophobic carrier according to an exemplary embodiment of the present specification has an advantage in that the nanoparticles prepared in a water system may be easily dispersed in the hydrophobic carrier.

BRIEF DESCRIPTION OF DRAWINGS

FIG. 1 illustrates a result that in the preparation method according to Example 1, nanoparticles move to a non-polar solution.

FIGS. 2 and 3 illustrate a transmission electron microscope (TEM) image of nanoparticles supported on a hydrophobic carrier according to Example 1.

FIGS. 4 and 5 illustrate a transmission electron microscope (TEM) image of nanoparticles supported on a hydrophobic carrier according to Example 2.

FIG. 6 illustrates a transmission electron microscope (TEM) image of nanoparticles supported on a hydrophobic carrier according to Example 3.

FIG. 7 illustrates a transmission electron microscope (TEM) image of nanoparticles supported on a hydrophobic carrier according to Example 4.

FIG. 8 illustrates a transmission electron microscope (TEM) image of nanoparticles supported on a carrier according to Comparative Example 1.

BEST MODE

When one part "includes" one constituent element in the present specification, unless otherwise specifically described, this does not mean that another constituent element is excluded, but means that another constituent element may be further included.

Hereinafter, the present specification will be described in more detail.

An exemplary embodiment of the present specification provides a method for preparing nanoparticles supported on a hydrophobic carrier, the method including: a nanoparticle preparing step of preparing nanoparticles; a nanoparticle surface modifying step of stirring a non-polar solution including an aqueous solution including the nanoparticles, a non-polar solvent, an organic dispersing agent, and acid to make the nanoparticles move to the non-polar solution; and a supporting step of supporting the nanoparticles onto a hydrophobic carrier by mixing the non-polar solution including the nanoparticles with the hydrophobic carrier.

The hollow metal nanoparticles supported on the carrier according to an exemplary embodiment of the present specification may be a complex of the carrier and hollow metal nanoparticles supported on the carrier. Further, the hollow metal nanoparticles supported on the carrier according to an exemplary embodiment of the present specification may be a catalyst.

The method for preparing nanoparticles supported on a hydrophobic carrier according to an exemplary embodiment of the present specification has an advantage in that the nanoparticles are prepared in a water system, and the surface of the nanoparticles having a hydrophilic surface may be modified, and as a result, the nanoparticles may be easily dispersed in a non-polar carrier.

Specifically, the method for preparing nanoparticles supported on a hydrophobic carrier according to an exemplary embodiment of the present specification has an advantage in that nanoparticles may be easily dispersed in a non-polar solvent, that is, a carbon-based carrier without being subjected to chemical treatment such as an acid treatment. Through this, it is possible to reduce the specific surface area of the carrier according to the chemical treatment and to prevent the electrical conductivity from being reduced, and furthermore, it is possible to prevent corrosion resistance of the carrier from deteriorating.

According to an exemplary embodiment of the present specification, the nanoparticle preparing step may be preparing nanoparticles by using an aqueous solution including at least one anionic surfactant.

According to an exemplary embodiment of the present specification, the nanoparticle preparing step may be preparing nanoparticles by using an aqueous solution including one or more anionic surfactants and one or more metal salts.

Further, the nanoparticles in the nanoparticle preparing step may be applied without limitation as long as the nanoparticles are nanoparticles prepared by using an anionic surfactant.

According to an exemplary embodiment of the present specification, the nanoparticle preparing step may be preparing an aqueous solution including nanoparticles in which at least one anionic surfactant is bonded to the surface of the nanoparticle.

According to an exemplary embodiment of the present specification, the nanoparticle may be a core-shell nanoparticle, a hollow nanoparticle including a hollow core, a bowl-type nanoparticle, and the like. However, the structure of the nanoparticle of the present specification is not limited to the example.

According to an exemplary embodiment of the present specification, the nanoparticles may have an average particle diameter of 30 nm or less. Specifically, according to an exemplary embodiment of the present specification, the nanoparticles may have an average particle diameter of 20 nm or less, or 12 nm or less, or 10 nm or less. In addition, according to an exemplary embodiment of the present specification, the nanoparticles may have an average particle diameter of 6 nm or less. According to an exemplary embodiment of the present specification, the nanoparticles may have an average particle diameter of 1 nm or more. When the nanoparticles have an average particle diameter of 30 nm or less, there is a big advantage in that the nanoparticle may be used in various fields. Furthermore, it is more preferred that the nanoparticles have an average particle diameter of 20 nm or less. Further, when the nanoparticles have an average particle diameter of 10 nm or less or 6 nm or less, the surface area of the particle is further widened, so that there is an advantage in that the applicability of using the nanoparticles in various fields is further increased. For example, when the nanoparticles formed in the range of the particle diameter are used as a catalyst, the efficiency may be significantly increased.

According to an exemplary embodiment of the present specification, the average particle diameter of the metal nanoparticles means a value obtained by using a graphic software (MAC-View) to measure the diameters of 200 or more hollow metal nanoparticles, and measuring an average particle diameter through a statistical distribution obtained.

According to an exemplary embodiment of the present specification, the particle diameter of a plurality of metal nanoparticles may be in a range of 80% to 120% of the average particle diameter of the metal nanoparticles. Specifically, the particle diameter of the metal nanoparticle may be in a range of 90% to 110% of the average particle diameter of the metal nanoparticles. When the particle diameter exceeds the range, the size of the metal nanoparticles becomes non-uniform as a whole, so that it may be difficult to secure unique physical property values required for the metal nanoparticles. For example, when metal nanoparticles exceeding a range of 80% to 120% of the average particle diameter of the metal nanoparticles are used as a catalyst, the activity of the catalyst may become a little insufficient.

According to an exemplary embodiment of the present specification, the nanoparticle may be a core-shell nanoparticle. According to an exemplary embodiment of the present specification, a step of preparing the core-shell nanoparticles includes a step of adding a first reducing agent to a first aqueous solution including a first metal salt; and a first surfactant to form a core particle including a first metal, and adding a second reducing agent to a second aqueous solution including the core particle; a second metal salt; and a second surfactant to form a shell including a second metal on at least a portion of a surface of the core particle, and at least one of the first and second surfactants may be an anionic surfactant.

In the step of preparing the core-shell nanoparticles according to an exemplary embodiment of the present specification, the first surfactant may form a micelle including a hydrophilic branch in the first aqueous solution. The first metal salt may be entrapped in the hydrophilic branch of the micelle, and the first metal salt dissolved in the first aqueous solution may be uniformly dispersed in the first aqueous solution by the entrapment. Furthermore, the first metal salt may be uniformly dispersed in the first solution, thereby forming core particles having a uniform size.

In addition, in the step of preparing the core-shell nanoparticles according to an exemplary embodiment of the present specification, the second surfactant may be adsorbed onto the surface of the core particle or the second metal salt. Furthermore, a complex of the core particle and the second metal salt may be formed because the second metal salt may be adsorbed onto the surface of the core particle by the second surfactant. In this case, the second surfactant may be adsorbed onto the surface of the second metal salt, and as a result, the complex of the core particle and the second metal salt may be uniformly dispersed in the second aqueous solution. The complex of the core particle and the second metal salt may be uniformly dispersed in the second solution, thereby forming core-shell particles having a uniform size.

According to an exemplary embodiment of the present specification, the nanoparticle may be a hollow nanoparticle. According to an exemplary embodiment of the present specification, the step of preparing the hollow nanoparticles may include adding a reducing agent to an aqueous solution including one or more anionic surfactants; a first metal salt; and a second metal salt to form a shell including a first metal and a second metal.

Further, according to an exemplary embodiment of the present specification, it is possible to prepare a nanoparticle having a structure in which at least a portion of the shell of the hollow nanoparticle is empty or a bowl-type nanoparticle by using an anionic surfactant and an amino acid-based stabilizer.

In the step of forming hollow nanoparticles according to an exemplary embodiment of the present specification, the one or more surfactants may form micelle in the aqueous solution and the first metal salt and the second metal salt may surround the outer surface of the micelle. Furthermore, the first metal salt and the second metal salt may be reduced to metals by the reducing agent, and the micelle region may be formed to have a hollow portion.

In the present specification, the "hollow" means that the core portion of the hollow metal nanoparticle is empty. Further, the hollow may include a space in which a material constituting the nanoparticle is not present by 50 vol % or more, specifically 70 vol % or more, and more specifically 80 vol % or more.

According to an exemplary embodiment of the present specification, the non-polar solvent in the nanoparticle surface modifying step may include a solvent having a dielectric constant of 15 or less. Specifically, as the non-polar solvent, hexane, benzene, toluene, chloroform, and the like may be applied, but the non-polar solvent is not limited thereto.

According to an exemplary embodiment of the present specification, the organic dispersing agent in the nanoparticle surface modifying step may include one or more selected from the group consisting of an alkyl amine-based material and a fatty acid-based material.

According to an exemplary embodiment of the present specification, the alkyl amine-based material may be a substituted or unsubstituted alkyl amine having 1 to 30 carbon atoms. Specifically, the alkyl amine-based material may be oleylamine.

According to an exemplary embodiment of the present specification, the fatty acid-based material may be a material having a structure in which a carboxyl group is substituted with a substituted or unsubstituted carbon chain having 1 to 30 carbon atoms. Specifically, the fatty acid-based material may be oleic acid.

According to an exemplary embodiment of the present specification, the nanoparticle surface modifying step may be a step in which the surface of the nanoparticle is hydrophobically modified.

According to an exemplary embodiment of the present specification, the acid in the nanoparticle surface modifying step may be hydrochloric acid.

According to an exemplary embodiment of the present specification, an anionic surfactant is bonded to the surface of the nanoparticle included in the aqueous solution, and hydrogen ions of the acid may serve to be bonded to a head group of the anionic surfactant to separate the anionic surfactant from the nanoparticle. Furthermore, the surface of the nanoparticle from which the anionic surfactant is separated may be bonded to an organic dispersing agent to hydrophobically modify the surface of the nanoparticle.

According to an exemplary embodiment of the present specification, the volume ratio of the aqueous solution including the nanoparticles to the non-polar solvent may be 1:1 to 1:3.

According to an exemplary embodiment of the present specification, the content of the organic dispersing agent may be 2 mmol to 5 mmol per 100 ml of the nan-polar solvent.

When the content of the organic dispersing agent is less than the range, there may occur a problem in that the nanoparticles do not smoothly move to the non-polar solution.

According to an exemplary embodiment of the present specification, the content of the acid may be 20 wt % to 80 wt % based on the aqueous solution including the nanoparticles.

When the content of the acid is less than the range, there may occur a problem in that the nanoparticles do not smoothly move to the non-polar solution.

In the nanoparticle surface modifying step according to an exemplary embodiment of the present specification, the aqueous solution including the nanoparticles may further include an alcohol-based solvent. Specifically, according to an exemplary embodiment of the present specification, the aqueous solution including the nanoparticles may further include ethanol.

According to an exemplary embodiment of the present specification, the content of the alcohol-based material to water in the alcohol-based solvent may be 80 vol % or more, or 90 vol % or more. When the content of the alcohol-based material of the alcohol-based solvent is 80 vol % or more, the nanoparticles may sufficiently move from the aqueous solution to the non-polar solution.

According to an exemplary embodiment of the present specification, the alcohol-based solvent may serve to increase the solubility of a surfactant included in an aqueous solution including nanoparticles to lower the viscosity of the aqueous solution including the nanoparticles, thereby making the nanoparticles included in the aqueous solution smoothly move to the non-polar solution.

In the nanoparticle preparing step according to an exemplary embodiment of the present specification, the aqueous solution may further include a stabilizer. Specifically, according to an exemplary embodiment of the present specification, the stabilizer may be one or a mixture of two or more selected from the group consisting of an amino acid, disodium phosphate, dipotassium phosphate, disodium citrate, and trisodium citrate.

In the supporting step according to an exemplary embodiment of the present specification, the hydrophobic carrier may be a carbon-based carrier which is not subjected to pre-treatment.

According to an exemplary embodiment of the present specification, as the carbon-based carrier, it is possible to use one selected from the group consisting of carbon black, carbon nanotube (CNT), graphite, graphene, activated carbon, mesoporous carbon, carbon fiber, and carbon nano wire.

According to an exemplary embodiment of the present specification, the carbon black may be Denka black, Ketjen black, or acetylene black.

According to an exemplary embodiment of the present specification, the hydrophobic carrier may be a carrier which is not subjected to chemical treatment such as an acid treatment. Specifically, according to an exemplary embodiment of the present specification, the hydrophobic carrier may be a carbon-based carrier which is not subjected to chemical treatment.

In the supporting step according to an exemplary embodiment of the present specification, the hydrophobic carrier may be a carrier which is included in an alcohol-based solvent.

An exemplary embodiment of the present specification may further include, after the supporting step, a step of performing an acetic acid treatment to remove the organic dispersing agent.

According to an exemplary embodiment of the present specification, the acetic acid treatment may be carried out under an atmosphere of 50° C. to 90° C. Specifically, according to an exemplary embodiment of the present specification, the acetic acid treatment may be carried out under an atmosphere of 60° C. to 70° C.

An exemplary embodiment of the present specification may further include, after the supporting step, a step of washing the carrier with an alcohol-based solution, and then drying the carrier. Specifically, according to an exemplary embodiment of the present specification, the alcohol-based solution in the step of washing the carrier, and then drying the carrier may be ethanol.

According to an exemplary embodiment of the present specification, the nanoparticle may be a metal nanoparticle. Specifically, according to an exemplary embodiment of the present specification, the nanoparticle may include one or more metals, and may be formed of a metal or an alloy of two or more metals. Specifically, according to an exemplary embodiment of the present specification, the nanoparticle is not formed of a metal oxide or a silicon oxide. However, the nanoparticle may include a portion of impurities in addition to the metal or the alloy of the metals.

According to an exemplary embodiment of the present specification, the nanoparticle may have a spherical shape.

The "spherical shape" of the present specification does not mean only a perfect spherical shape, and may include a roughly spherical shape. For example, in the nanoparticle, the outer surface having a spherical shape may not be smooth, and the radius of curvature in one nanoparticle may not be constant.

According to an exemplary embodiment of the present specification, in the nanoparticle preparing step, the concentrations of the one or more surfactants may be each 1 time to 10 times the critical micelle concentration (CMC) to water.

The critical micelle concentration (CMC) in the present specification means the lower limit of the concentration at which the surfactant forms a group (micelle) of molecules or ions in a solution.

In the nanoparticle preparing step according to an exemplary embodiment of the present specification, the one or more metal salts may be each a nitrate, a halide, a hydroxide or a sulfate of the metal.

According to an exemplary embodiment of the present specification, the metal salt is not particularly limited as long as the metal salt may be each ionized in a solution to provide metal ions or atomic group ions including metal ions.

According to an exemplary embodiment of the present specification, the metal salt may be each independently a salt of those selected from the group consisting of metals which belong to Groups 3 to 15 of the periodic table, metalloids, lanthanide metals, and actinide metals.

According to an exemplary embodiment of the present specification, the metal salt may be each a salt of a metal selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu).

The anionic surfactant of the present specification may be selected from the group consisting of ammonium lauryl sulfate, sodium 1-heptanesulfonate, sodium hexanesulfonate, sodium dodecyl sulfate, triethanol ammonium dodecylbenzenesulfate, potassium laurate, triethanolamine stearate, lithium dodecyl sulfate, sodium lauryl sulfate, alkyl polyoxyethylene sulfate, sodium alginate, dioctyl sodium sulfosuccinate, phosphatidylglycerol, phosphatidylinositol, phosphatidylserine, phosphatidic acid and salts thereof, glyceryl esters, sodium carboxymethylcellulose, bile acids and salts thereof, cholic acid, deoxycholic acid, glycocholic acid, taurocholic acid, glycodeoxycholic acid, alkyl sulfonate, aryl sulfonate, alkyl phosphate, alkyl phosphonate, stearic acid and salts thereof, calcium stearate, phosphate, carboxymethylcellulose sodium, dioctyl sulfosuccinate, dialkyl esters of sodium sulfosuccinate, phospholipids, and calcium carboxymethylcellulose. However, the anionic surfactant is not limited thereto.

According to an exemplary embodiment of the present application, the reducing agent is not particularly limited as long as the reducing agent is a strong reducing agent having a standard reduction potential of −0.23 V or less, specifically from −4 V to −0.23 V, and has a reducing power which may reduce the dissolved metal ions to be precipitated as metal particles.

The reducing agent may be, for example, at least one selected from the group consisting of $NaBH_4$, $NH_2NH_2$, $LiAlH_4$, and LiBEt3H.

When a weak reducing agent is used, a reaction speed is slow and a subsequent heating of the solution is required, so that it is difficult to achieve a continuous process, and thus, there may be a problem in terms of mass production, and particularly, when ethylene glycol, which is one of the weak reducing agents, is used, there is a problem in that the productivity is low in a continuous process due to a decrease in flow rate caused by high viscosity.

An exemplary embodiment of the present specification provides nanoparticles supported on a carrier, prepared by the preparation method.

An exemplary embodiment of the present specification provides nanoparticles supported on a hydrophobic carrier, including: a hydrophobic carrier; and one or more nanoparticles supported on the hydrophobic carrier, in which the hydrophobic carrier is a carbon-based carrier, which is not subjected to pre-treatment. Specifically, according to an exemplary embodiment of the present specification, the nanoparticles supported on the hydrophobic carrier may have an average particle diameter of 30 nm or less.

According to an exemplary embodiment of the present specification, each configuration of the nanoparticles supported on the hydrophobic carrier is the same as the content described above.

According to an exemplary embodiment of the present specification, the hydrophobic carrier is not subjected to chemical pre-treatment and has an advantage in that the electrical conductivity is high and the specific surface area is wide.

Specifically, for comparison of electrical conductivities and specific surface areas of the acid-treated hydrophobic carrier and the hydrophobic carrier of the present specification, which is not subjected to acid treatment, the results obtained by using Vulcan XC-72R and Ketjen 600JD, which are a carbon carrier, to measure physical properties are shown in the following table 1.

TABLE 1

| | Electrical conductivity (S/cm) @ 1600 Kg | BET specific surface area ($m^2$/g) |
|---|---|---|
| Vulcan XC-72R which is not subjected to pre-treatment | 25.1 | 225 |
| Acid-treated Vulcan XC-72R | 7 | 160 |
| Ketjen 600JD which is not subjected to pre-treatment | 23 | 1400 |
| Acid-treated Ketjen 600JD | 5.5 | 650 |

As can be seen in Table 1, it can be seen that there is a significant difference in physical properties between the pre-treated carrier and the carrier which is not subjected to pre-treatment. Therefore, it is possible to infer excellent electrical conductivity and catalytic activity of nanoparticles supported on a hydrophobic carrier according to an exemplary embodiment of the present specification.

The electrical conductivity is a resistance value of a powder to be measured, which is measured by using a powder resistance apparatus under a pressure of 1,600 Kg.

The BET specific surface area was measured by an ASAP 2010 apparatus manufactured by Micromeritics Inc., and means a value calculated by performing the pre-treatment at 200° C. for 12 hours, and then setting the relative pressure to 0.05 to 3, and measuring 5 points.

An exemplary embodiment of the present specification provides a catalyst including the nanoparticles supported on the carrier.

MODE FOR INVENTION

Hereinafter, the present specification will be described in detail with reference to the Examples for specifically describing the present specification. However, the Examples according to the present specification may be modified in various forms, and it is not interpreted that the scope of the present specification is limited to the Examples described below in detail. The Examples of the present specification are provided to more completely explain the present specification to a person with ordinary skill in the art.

Example 1

0.06 mmol of Ni(NO$_3$)$_2$ as a first metal salt, 0.02 mmol of K$_2$PtCl$_4$ as a second metal salt, 0.2 mmol of trisodium citrate as a stabilizer, and 1 ml of 30% ammonium lauryl sulfate (ALS) as a surfactant were added to and dissolved in 52 ml of water to form a solution, and the solution was stirred for 30 minutes. In this case, the molar ratio of Ni(NO$_3$)$_2$ to K$_2$PtCl$_4$ was 3:1, and in this case, the concentration of the measured ALS was approximately 2 times the critical micelle concentration (CMC) to water. Continuously, 0.26 mmol of NaBH$_4$ being a reducing agent was added to the solution, and the resulting mixture was reacted for 30 minutes.

A non-polar solution, in which 30 ml of hexane and 0.22 ml of oleylamine were mixed, was added to an aqueous solution including the nanoparticles, 13 ml of 1.3 mol hydrochloric acid and 56 ml of ethanol were further added to the resulting solution, and then the resulting mixture was vigorously stirred and then left to stand to confirm that the nanoparticles moved to the hexane layer.

FIG. 1 illustrates a result that in the preparation method according to Example 1, nanoparticles move to a non-polar solution. Specifically, FIG. 1(1) illustrates a state before hexane was added to the aqueous solution including the nanoparticles and the resulting solution was stirred, and FIG. 1(2) illustrates a state where the aqueous solution was stirred and then left to stand, and then the nanoparticles moved to hexane.

Furthermore, hexane including the nanoparticles was injected into a carbon carrier (Ketjen 600JD) which was included in ethanol and was not subjected to pre-treatment, and the resulting mixture was stirred for 1 to 2 hours. Furthermore, in order to remove oleylamine, an acetic acid treatment was performed at 70° C., the nanoparticles were washed with ethanol, and then dried to prepare nanoparticles supported on a hydrophobic carrier.

FIGS. 2 and 3 illustrate a transmission electron microscope (TEM) image of nanoparticles supported on a hydrophobic carrier according to Example 1.

Example 2

Nanoparticles supported on a hydrophobic carrier were prepared in the same manner as in Example 1, except that as a carbon carrier which was not subjected to pre-treatment, Vulcan XC-72R was used.

FIGS. 4 and 5 illustrate a transmission electron microscope (TEM) image of nanoparticles supported on a hydrophobic carrier according to Example 2.

Example 3

Nanoparticles supported on a hydrophobic carrier were prepared in the same manner as in Example 1, except that as a carbon carrier which was not subjected to pre-treatment, carbon nanotube (CNT) was used.

FIG. 6 illustrates a transmission electron microscope (TEM) image of nanoparticles supported on a hydrophobic carrier according to Example 3.

Example 4

0.03 mmol of Ni(NO$_3$)$_2$ as a first metal salt, 0.01 mmol of K$_2$PtCl$_4$ as a second metal salt, 0.05 mmol of glycine as a stabilizer, and 0.3 ml of 30% ammonium lauryl sulfate (ALS) as a surfactant were added to and dissolved in 26 ml of water to form a solution, and the solution was stirred for 30 minutes. Continuously, 0.13 mmol of NaBH$_4$ being a reducing agent was added to the solution, and the resulting mixture was reacted for 30 minutes.

A non-polar solution, in which 30 ml of hexane and 0.22 ml of oleylamine were mixed, was added to an aqueous solution including the nanoparticles, 26 ml of 1.3 mol hydrochloric acid and 56 ml of ethanol were further added to the resulting solution, and then the resulting mixture was vigorously stirred and then left to stand to confirm that the nanoparticles moved to the hexane layer.

Furthermore, hexane including the nanoparticles was injected into a carbon carrier (Vulcan XC-72R) which was included in ethanol and was not subjected to pre-treatment, and the resulting mixture was stirred for 1 to 2 hours. Furthermore, in order to remove oleylamine, an acetic acid treatment was performed at 70° C., the nanoparticles were washed with ethanol, and then dried to prepare nanoparticles supported on the hydrophobic carrier.

FIG. 7 illustrates a transmission electron microscope (TEM) image of nanoparticles supported on a hydrophobic carrier according to Example 4.

Comparative Example 1

An aqueous solution including the nanoparticles as in Example 1 was injected into a carbon carrier (Vulcan XC-72R) which was included in ethanol and was not subjected to pre-treatment, and the resulting mixture was stirred for 1 to 2 hours. Furthermore, in order to remove the surfactant, an acetic acid treatment was performed at 70° C., the nanoparticles were washed with ethanol and water, and then dried to prepare nanoparticles supported on the carrier.

FIG. 8 illustrates a transmission electron microscope (TEM) image of nanoparticles supported on a carrier according to Comparative Example 1.

As can be seen in FIGS. 2 to 7, in the case of the nanoparticles supported on the hydrophobic carrier according to the Examples, a large number of nanoparticles are uniformly supported on the carrier. In contrast, it can be seen that in the case of the nanoparticles supported on the carrier according to the Comparative Example in FIG. 8, most of the nanoparticles fail to be supported on the carrier.

The invention claimed is:

1. A method for preparing nanoparticles supported on a hydrophobic carrier, the method comprising successively:
   a nanoparticle preparing step of preparing nanoparticles;
   a nanoparticle surface modifying step of stirring a non-polar solution comprising an aqueous solution comprising the nanoparticles, a non-polar solvent, an organic dispersing agent, and acid to make the nanoparticles move to the non-polar solution; and
   a supporting step of supporting the nanoparticles onto a hydrophobic carrier by mixing the non-polar solution comprising the nanoparticles with the hydrophobic carrier,
   wherein the hydrophobic carrier is a carbon carrier which is not subjected to pre-treatment,
   wherein the nanoparticle preparing step prepares nanoparticles by using an aqueous solution comprising at least one anionic surfactant, and
   wherein the organic dispersing agent in the nanoparticle surface modifying step comprises a substituted or unsubstituted alkyl amine having 1 to 30, and during the nanoparticle surface modifying step, the hydrogen ions of the acid bonded to a head group of the anionic surfactant to separate the anionic surfactant from the nanoparticle and the surface of the nanoparticle from which the anionic surfactant is separated bonded to the organic dispersing agent.

2. The method of claim 1, wherein, in the nanoparticle preparing step, the at least one anionic surfactant is bonded to a surface of the nanoparticle.

3. The method of claim 1, wherein the nanoparticles have an average particle diameter of 30 nm or less.

4. The method of claim 1, wherein the non-polar solvent in the nanoparticle surface modifying step comprises a solvent having a dielectric constant of 15 or less.

5. The method of claim 1, wherein the nanoparticle surface modifying step hydrophobically modifies the surfaces of the nanoparticles.

6. The method of claim 1, wherein a volume ratio of the aqueous solution comprising the nanoparticles to the non-polar solvent is 1:1 to 1:3.

7. The method of claim 1, wherein a content of the organic dispersing agent is 2 mmol to 5 mmol per 100 ml of the non-polar solvent.

8. The method of claim 1, wherein a content of the acid is 20 vol % to 80 vol % based on the aqueous solution comprising the nanoparticles.

9. The method of claim 1, wherein the aqueous solution comprising the nanoparticles in the nanoparticle surface modifying step further comprises an alcohol-containing solvent.

10. The method of claim 1, wherein the hydrophobic carrier in the supporting step is comprised in an alcohol-containing solvent.

11. The method of claim 1, further comprising, after the supporting step, a step of performing an acetic acid treatment to remove the organic dispersing agent.

12. The method of claim 11, wherein the acetic acid treatment is carried out under an atmosphere of 50° C. to 90° C.

13. The method of claim 1, wherein the carbon carrier is at least one selected from the group consisting of carbon black, carbon nanotube (CNT), graphite, graphene, activated carbon, mesoporous carbon, carbon fiber and carbon nano wire.

* * * * *